United States Patent [19]

Couvrette

[11] Patent Number: 5,172,791
[45] Date of Patent: Dec. 22, 1992

[54] CONVEYING APPARATUS HAVING IMPROVED RELIABILITY AND SECURITY

[76] Inventor: Edward F. Couvrette, 11478 Woodside Ave. North, Santee, Calif. 92071

[21] Appl. No.: 634,036

[22] Filed: Dec. 26, 1990

[51] Int. Cl.⁵ .............................................. B61B 13/12
[52] U.S. Cl. ........................................ 186/37; 186/17; 104/115; 104/244
[58] Field of Search .......................... 186/14, 17, 30, 34, 186/37, 41, 53; 104/53, 112, 115, 116, 117.1, 173.1, 180, 244; 198/750

[56] References Cited

U.S. PATENT DOCUMENTS

| | | | |
|---|---|---|---|
| 505,905 | 10/1893 | Spear | 186/15 |
| 838,746 | 12/1906 | Pearson | 104/115 |
| 2,900,046 | 8/1959 | Bailey | 186/35 |
| 2,904,131 | 9/1959 | Bailey | 186/36 |
| 3,858,520 | 1/1975 | Patin | 104/115 X |
| 3,875,868 | 4/1975 | Martin | 104/244 |
| 3,881,573 | 5/1975 | Cotter et al. | 186/37 |
| 4,010,824 | 3/1977 | Bavis | 186/37 |
| 4,014,407 | 3/1977 | Painter | 186/17 X |
| 4,605,102 | 8/1986 | Morano et al. | 186/37 |

Primary Examiner—F. J. Bartuska
Attorney, Agent, or Firm—Frank D. Gilliam

[57] ABSTRACT

A conveyor system for moving a container, such as a cash box, between a main station, such as a bank building, and one or more secondary stations, such as an automatic teller machine. The conveyor includes at least two continuous smooth tubes running between the stations. A carriage rides along the tubes on two sets of wheels to keep the carriage in the desired alignment. A bracket secures the carriage to a movable cable that runs adjacent to the tube and is entrained over a plurality of pulleys. The bracket is configured to lift the cable away from individual pulleys as the bracket passes each pulley to avoid contact between bracket and cable. A drive mechanism moves the cable to move the carriage between stations. This system is adapted to move the carriage through a tunnel in an overhead canopy or through an underground tunnel where, for example, the carriage carries a cash box to drive-up automatic teller machines. This is a highly reliable, highly secure system particularly adapted to conveying cash or the like.

13 Claims, 4 Drawing Sheets 5,172,791

CONVEYING APPARATUS HAVING IMPROVED RELIABILITY AND SECURITY

BACKGROUND OF THE INVENTION

This invention relates in general to conveying systems and, more particularly, to a highly reliable and secure system particularly adapted to convey cash boxes between a main station, such as a bank building, and outlying stations, such as automatic teller machines.

Conveying systems have long been used for conveying containers from a central station to other stations, such as for moving cash from a salesman to a cashier in a store, then returning change and a receipt to the salesman, as shown, for example, by Spear in U.S. Pat. No. 505,905, granted in 1893.

Other conveyor systems have been used to move mail from a streetside mailbox to a Post Office as described by Bailey in U.S. Pat. No. 2,900,046 and to move milk, newspapers and the like from a streetside delivery box into a house, as described by Bailey in U.S. Pat. No. 2,904,131. These tend to be cumbersome, have low security and only include two end stations. Reliability of these systems is not high, with a significant chance of jamming along the conveyor.

In recent years simple conveying systems have come into widespread use in banks or other businesses where customers drive up to remote stations and pass cash or articles back and forth to a bank or main building. Typical of these are the systems described by Bavis in U.S. Pat. No. 4,010,824 and Painter in U.S. Pat. No. 4,014,407. While effective for this purpose, these system generally convey only small volumes, typically, checks, cash, deposit slips or the like.

Recently, automatic teller machines (ATM) have proliferated greatly. These generally free-standing machines include a cash box and a withdrawal or deposit system through which a patron can withdraw cash using a debit card or make a deposit, using a keypad to enter a password, the type of transaction desired and amounts involved. Often, these machines are installed adjacent to bank driveways, so that patrons can operate the machine from their automobiles. From time to time it becomes necessary to replenish the cash in the ATM cash box and remove deposit envelopes. In the past, it has been necessary for a bank employee, generally accompanied by at least one guard, to carry a cash box out to the ATM in any weather, open the ATM, exchange boxes or fill the cash boxes with raw cash, lock up the ATM and return to the bank. This is labor intensive, and may result in considerable delays when sensors in more than one ATM signals the need for additional cash and sufficient personnel are not available to service all of them at the same time. Also, security is poor, since the cash box (which is filled with virtually untraceable small bills) is vulnerable during the transfer operation and the ATM itself may not be sufficiently secure, since it must be capable of easy and quick opening and relocking during the exchange procedure.

Thus, there is a continuing need for improved systems for replenishing such drive-up ATMs. Prior conveyor systems might be adapted to this use. However, prior systems are often complex and cumbersome, subject to breakdowns which might leave a cash box stuck and vulnerable between stations. Many prior systems could not handle the weight and size of the ATM cash box. Also, a highly reliable system is necessary to permit each ATM to be locked securely, such as by a time lock or very sturdy locking arrangements which cannot be quickly or easily defeated. With a very reliable conveying system the down time of the ATM, personal work time and money exposure time will be reduced.

SUMMARY OF THE INVENTION

The above-noted problems, and others, are overcome in accordance with this invention by a highly reliable and secure conveyor system basically comprising a main station, at least one secondary station, a cooperating support tube and pulley-and-cable system extending between said main station and each secondary station and a carriage adapted to be moved along the support tube between stations by a the cable drive means.

This system is particularly suitable for high security applications where reliability and resistance to break-ins of the container is of great importance. Typical of such applications is the conveying of cash boxes between a main bank building and one or more remote ATMs, typically drive-through ATMs. The cash box is filled in the bank under secure conditions, the conveyor moves it through a tube, tunnel or the like to the ATM where it is placed in the cash dispensing mechanism of the ATM. Cash is dispensed from, and deposits collected in, the cash box in a conventional manner. When empty of cash or filled with deposits as indicated by conventional sensors, or at a selected time, the cash box is returned to the bank building via the conveyor for replenishment. The ATM can be very secure and any servicing door locks can be difficult to defeat, possibly having a time lock, since it will only need to be entered on rare occasions, perhaps once at a scheduled time every few days, or for dispenser repair or the like.

BRIEF DESCRIPTION OF THE DRAWING

Details of the invention and of a preferred embodiment thereof will be further understood upon reference to the drawing, wherein.

DETAILED DESCRIPTION OF PREFERRED EMBODIMENTS

Figure 1:
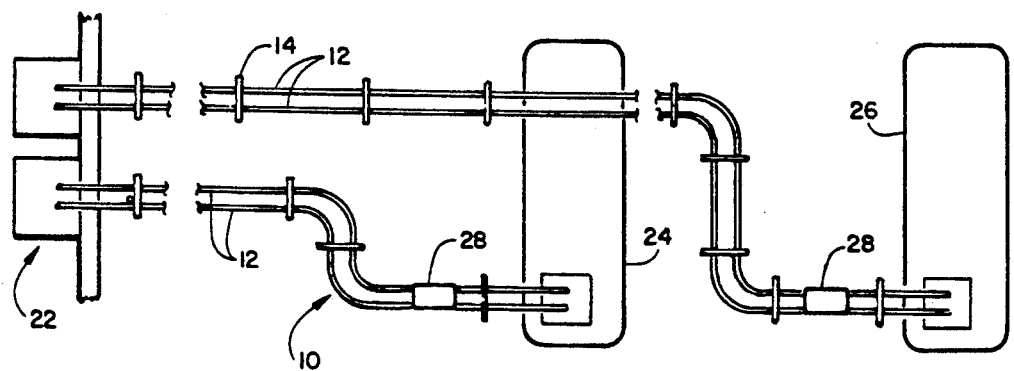
FIG. 1 is a schematic plan view of the overall system, here serving two secondary stations.
Figure 2:
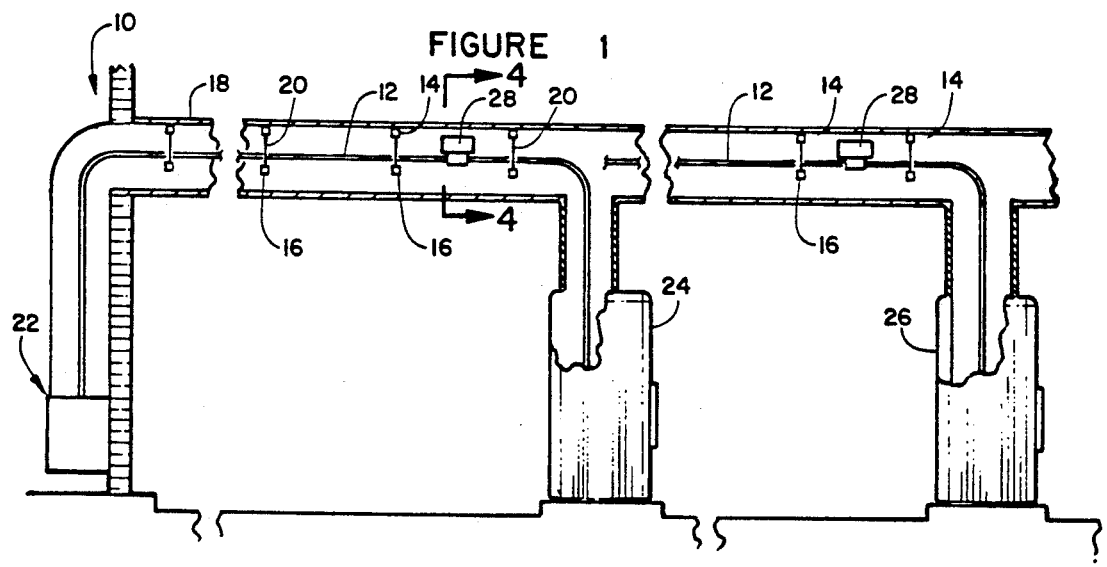
FIG. 2 is a schematic side elevation view of the system shown in FIG. 1.

Referring now to FIG. 1 and 2, there is seen a schematic plan view of a conveyor system 10 which includes in this embodiment two conveyors each including a set of spaced, parallel support tubes 12. Tubes 12 and are supported by a plurality of channels 16 hung from the top of an enclosure, such as tunnel 18 (seen in FIG. 2) by threaded rods 20 which engage the ends of channels 16 in a conventional manner and depend from cross beams 14. While it is preferred that tubes 12 have circular cross-sections, other configurations such as a diamond cross-section could be used where suitable. Conveyor 10 extends from a main station 22, typically a bank building, to first and second secondary stations 24 and 26, typically ATM kiosks adjacent to driveways. These kiosks could, for example, include any conventional ATM mechanisms, such as the 5088 ATM available from NCR. Carriages 28 move along support tubes 12 between main station 22 and the secondary stations 24 and 26, as detailed below.

Figure 3:
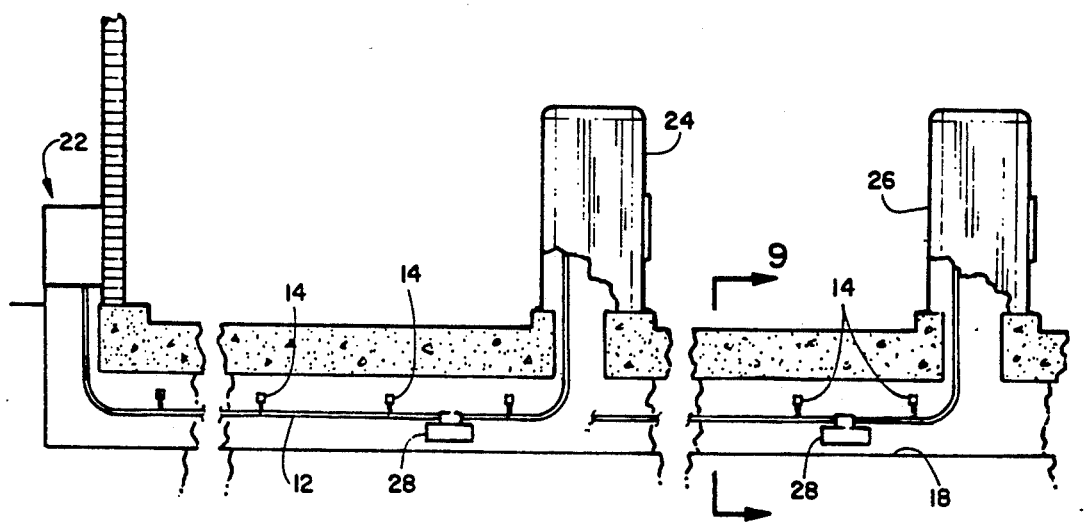
FIG. 3 is schematic side elevation view of a second embodiment of the overall system.

An alternative embodiment for use where an overhead canopy is not available or where overhead conveyance is not desired is shown in FIG. 3. In this embodiment carriages 28 move through a tunnel 18 below rather than above the driveways. Carriages 28 are basically the same as in the first embodiment, except that in this case they ride below, rather than above, support tube 12. In order to permit the use of a narrow tunnel, the two sets of support tubes 12 can be closely spaced if desired, with the limitation that one of the two carriages must be at one or the other station when the second carriage is moved, since in this case they cannot pass each other in tunnel 18. The tube supporting components in this embodiment depend from any suitable adjacent structure, such as a beam 14 across the top of tunnel 18. The system is operated just as is the first embodiment, except that at the main station the drive mechanism enclosure 22 is above, rather than below the carriages 28.

Figure 4:
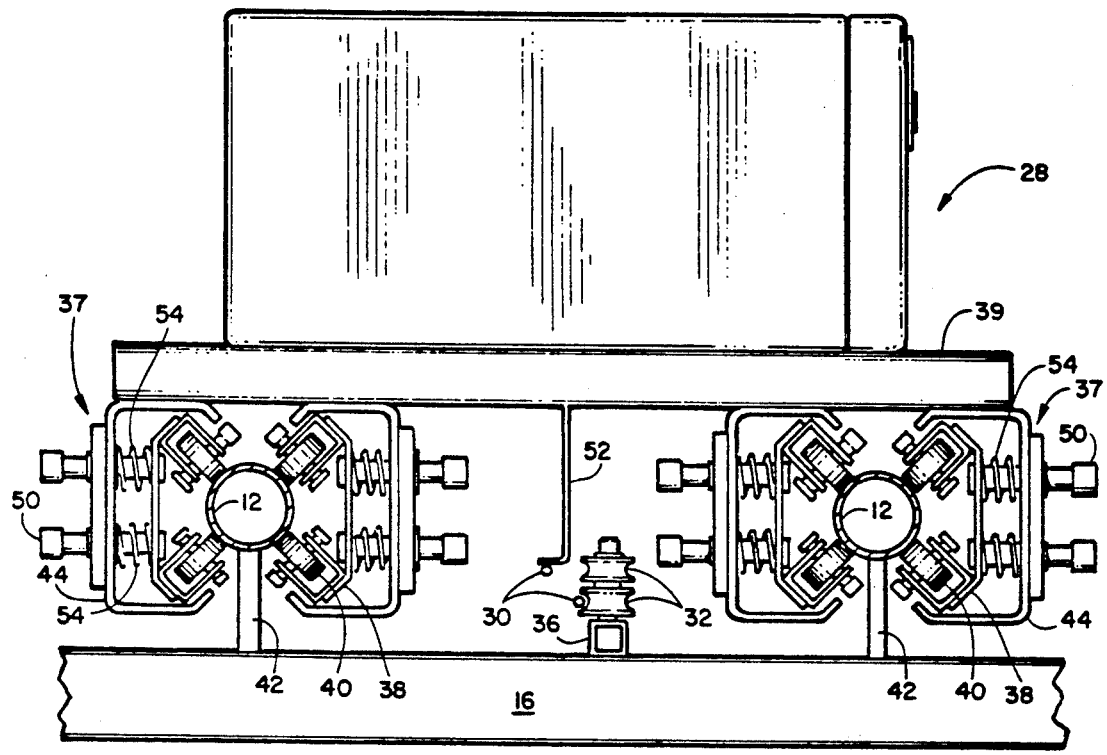
FIG. 4 is a vertical section view taken on line 4—4 in FIG. 2.
Figure 5:
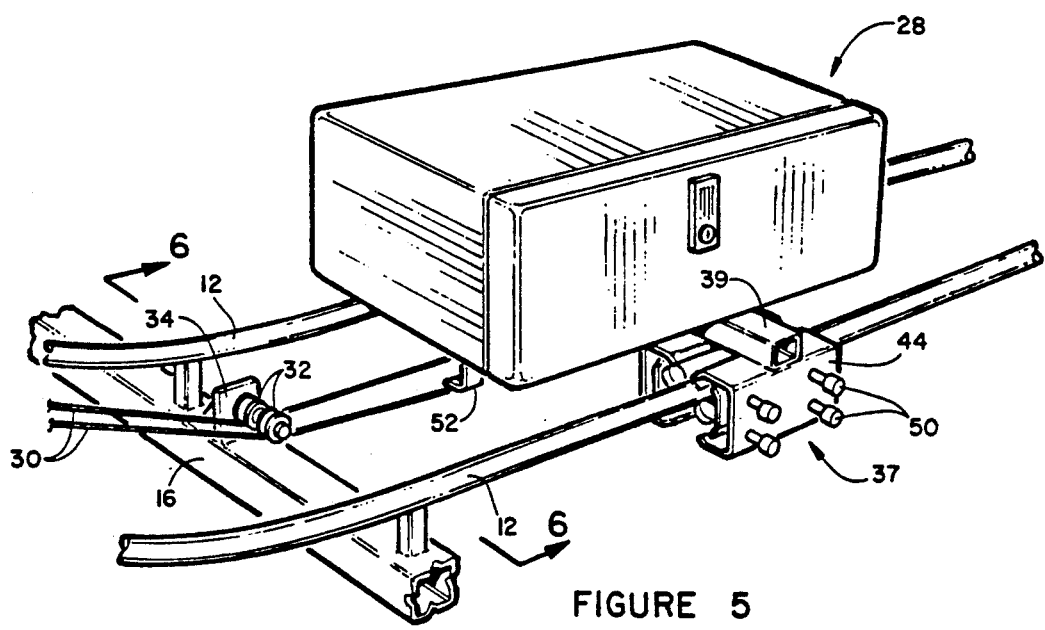
FIG. 5 is a detail perspective view of a container and a portion of the guide tube and pulley-and-cable system.
Figure 6:
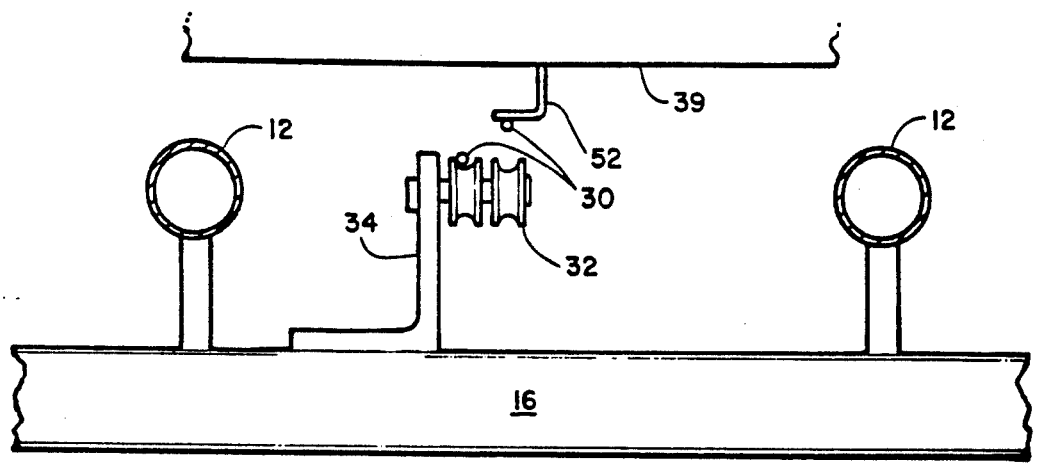
FIG. 6 is a detail section view taken approximately at line 6—6 in FIG. 5, as the container approaches a horizontal pulley assembly.

In both embodiments, carriages 28 are moved along support tubes 12 by cables 30 running over a plurality of pulleys 32, as seen in FIGS. 4-6. Pulleys 32 are mounted on vertical pulley brackets 34 secured to support tubes 12. The arrangement of pulleys where support tube 12 makes a horizontal turn is shown in FIG. 4 with the pulleys arranged vertically on bracket 36. Horizontal pulley brackets 36 are mounted along support tube in regions where transverse alignment of support tube is required, as seen in FIG. 1.

In the embodiments shown in FIGS. 2 and 3, the conveyor system is located in a tunnel or other secure enclosure 18 in a conventional overhead canopy or beneath the driveway, with carriages 28 moving vertically from main station 22, horizontally through tunnel 18 and vertically into secondary stations 24 and 26. The conveyor thus can be made very secure against any attempt to break into the main station, tunnel or secondary stations. This high security arrangement is of particular value where it is used with a bank and ATM system where the ATMs are in use and contain large amounts of cash even when the bank is closed.

Figure 8:
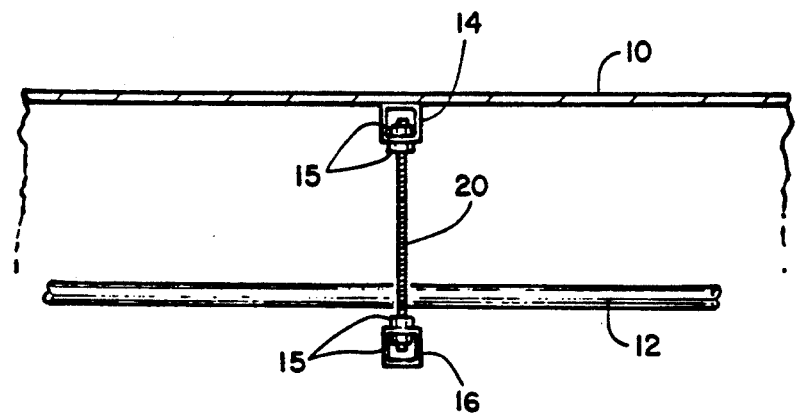
FIG. 8 is a detail side elevation view of the hanger assembly used in the embodiment of FIG. 2.

Details of carriage 28 are provided in FIGS. 4-5 which are front and side perspective views of carriage 28 in place on support tubes 12. Support tubes 12 is mounted on a plurality of short first posts 42 (typically square steel tubes), two of which extend upwardly from each channel 16 and are secured, such as by welding between support tube 12 and an adjacent fixed structure, here channel 16. Channel 16 could, of course be any horizontal member, such as a solid bar or the like, although the channel configuration is preferred for the optimum combination of strength and light weight. Each channel 16 is supported from the overhead, which may typically be the beams of an overhead canopy or the ceiling of any other enclosure, a tunnel or the like. Long bolts, smooth rods welded to channel 16 or any other suitable arrangement could be used if desired. Threaded rods are preferred, however, for ease of installation and of convenience in varying the height of the channels to assure uniform support for tube 12. Details of this support means are provided in FIG. 8. Threaded rod 20 is threaded into nuts 15 inside and outside tubes 14 and 16, providing easy adjustment of the height of tubes 12.

A number of carriage guide assemblies 37 are provided on each carriage 28 (preferably 2, as shown, although 4 or even more could be used where a very large or heavy carriage was to be transported) to guide and convey the carriage along tubes 12. Assemblies 37 are secured to beams 39, such as by welding. Each assembly 37 includes a pair of inner brackets 38 each supports a pair of wheels 40 which ride on a support tube 12. While wheels 40 may be made from any suitable material, an acetal resin such as Delrin from E. I duPont de Nemours & Co. is preferred for long life and least wear on tubes 12. Preferably, wheels 40 are spaced about 90° apart. A plurality of pins 50 are secured to inner brackets 38 and slidable extend through holes in outer bracket 44. Compression springs 54 surround each pin 50 in the inter-bracket space to bias inner brackets 38 toward support tube 16. This arrangement provides a degree of resiliency in the system, so that wheels 40 can deflect slightly in turns or to accommodate slight irregularities in the surfaces of support tubes 12 or in the spacing between parallel tubes 12.

Pulley brackets 34 and 36 secured to support tubes 12 serve to support cable pulleys 32 as discussed above.

Carriage 28 is secured to cable 30 for movement therewith by a cable bracket 52 mounted on beam 39 and secured to cable 30 by welding or a sleeve, not shown, surrounding the cable with the sleeve crimped to cable 30 and welded to bracket 52.

Details of the pulley brackets for horizontal turns of support tube 12 are shown in FIG. 4. When carriage 28 is between pulley sets, both cables 30 ride on pulleys 32. When carriage 28 approaches a pulley set, in order to prevent impact between bracket 52 and a pulley, bracket 52 is offset relative to the location of the pulley set as seen in FIG. 4 to cause the cable secured to the bracket to be momentarily lifted away from the pulley.

Figure 7:
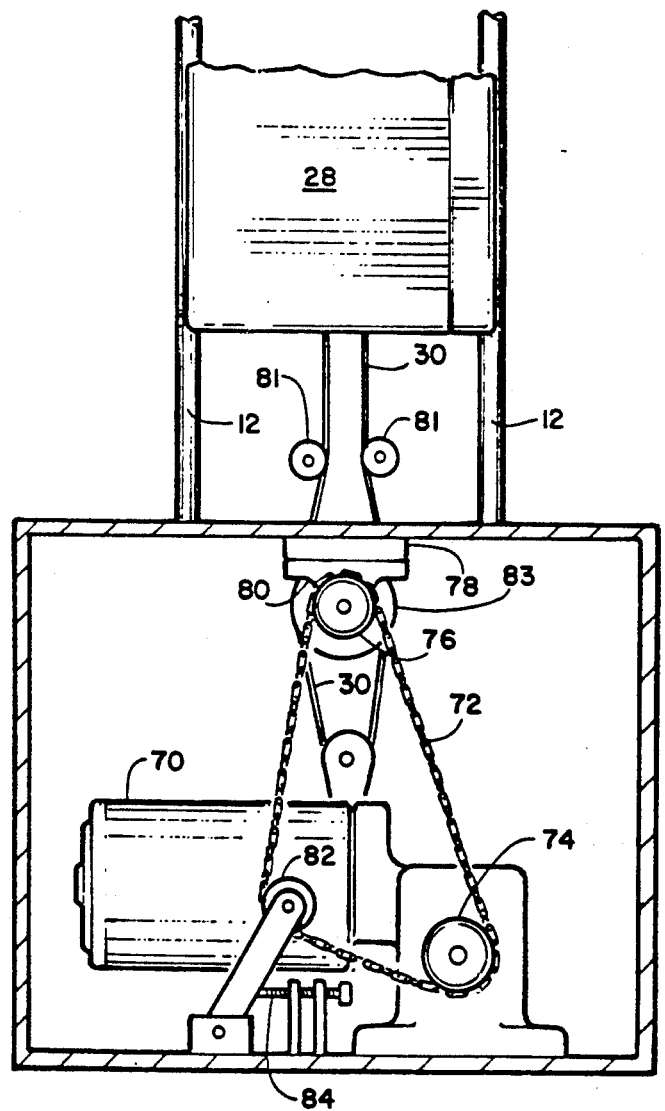
FIG. 7 is a schematic elevation view of a drive means for moving the container along the system.

Details of the pulley arrangement for horizontal movement or vertical changes of direction are shown in FIG. 6. Pulley set 32 here extends horizontally from bracket 34. Pulley set 32 is offset relative to the end of cable bracket 52 sufficiently that the cable is lifted away from the pulley as the carriage passes the pulley set so as to prevent contact between bracket 52 and pulley 32.

Where only a single secondary station is used, cable 30 could simply pass around a drive pulley at the main station, to be driven in either direction by a motor controlled by simple manual switches. A suitable selective drive mechanism for controlling the movement of carriage 28 going to a secondary station is shown in FIG. 7.

A conventional gear motor 70 drives a chain belt 72 through a motor pulley 74 to a pulley 76 which is mounted on a plate 78 through a pillow block 80. Cable 30 passes a pair of idler pulleys 81 which allow cable 30 to diverge and engage large pulley 83 secured to pulley 76 through a shaft for rotation therewith. Cable 30 continues around an idler pulley (not seen) in a conventional tensioning device 82 which can be moved up or down to selectively decrease or increase the tension in cable 30 Chain belt 72 is also entrained around an idler 82 which is movable by a tensioning screw mechanism 84 to vary tension in belt 72. Motor 70 is reversible to drive the carriage 28 in either direction. Any suitable conventional limit switches and motor reversing switches may be used to stop the movement of the carriage at the selected positions at the main secondary stations. A conventional ATM cash box can be transported by the conveyor, which when the safe is opened can be brought into operative engagement with the dispensing mechanism when it arrives at the selected location in the ATM.

Figure 9:
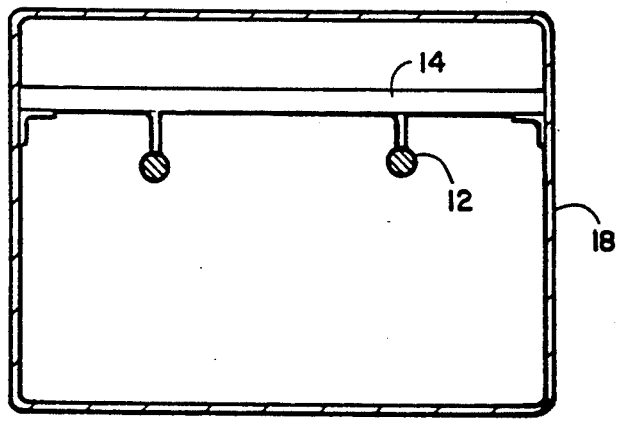
FIG. 9 is a detail section view taken on line 9—9 in FIG. 3.

Details of the carriage suspension arrangement for use in the embodiment of FIG. 3 is provided in FIG. 9. Crossbeams 14 extend between the sidewalls of tunnel 18 and are secured thereto. Carriage 28 is suspended from and rides along tubes 12 as described above.

Figure 10:
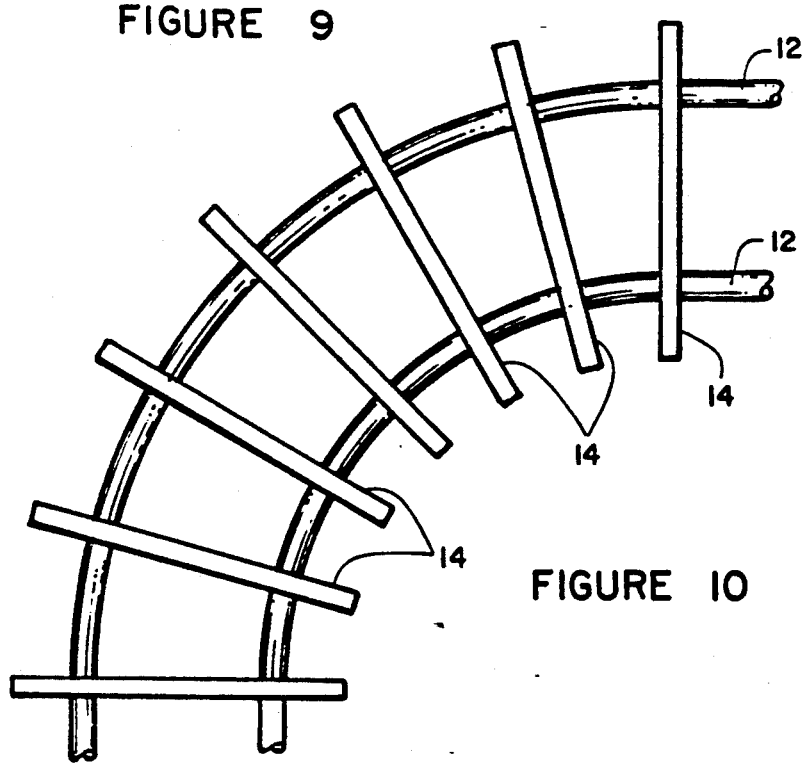
FIG. 10 is a detail plan view of a portion of the guide tube support system in a horizontal turn.

Details of the suspension for tubes 12 along a horizontal turn are provided in a detail plan view in FIG. 10. A plurality of more closely spaced, angled cross beams 14 are provided, typically about 7 for each turn. Similarly, beams 14 will be more closely spaced along vertical turns than is necessary along straight horizontal or vertical runs.

While certain specific arrangement, sizes and material were specified in conjunction with the above description of preferred embodiments, those can be varied, where suitable, with similar results. Other variations, applications and ramifications of the present invention will occur to those skilled in the art upon reading this disclosure. Those are intended to be included within the scope of this invention, as defined in the appended claims.

I claim:

1. A high security, high reliability, conveyor system which comprises:
   a main station;
   at least one secondary station;
   a pair of substantially parallel, smooth, continuous tubes extending between said main and each secondary station;
   a carriage adapted to move along each pair of said tubes, said carriage comprises a plurality of assemblies, said assemblies each comprises a pair of inner brackets each of which support a pair of wheels which ride on one of said tubes, a plurality of pins secured to said inner bracket, a pair of outer brackets having spaced apart apertures equal in number to said plurality of pins adjacent to and spaced from said inner brackets, said pins slideably extend through said apertures in said outer brackets and compression springs surrounding each pin in the space between said inner and outer brackets, said assemblies provide a degree of resiliency to carriage movement so that said wheels can deflect slightly in turns, accommodate slight irregularities in the surface and spacing between said tubes;
   cable means extending between said stations along said support means;
   a plurality of pulleys on said support means adapted to guide said cable substantially parallel to said tubes;
   at least one bracket securing said carriage to said cable for movement therewith along said tubes;
   drive means at said mains station for selectively moving said cable to move said carriage toward or away from the secondary station;
   whereby said carriage is movable between said main station and said secondary station.

2. The conveyor system according to claim 1 wherein four of said wheels are substantially equally spaced around said tube.

3. The conveyor system according to claim 1 wherein an enclosure surrounds said conveyor between stations and said support means comprises a first plurality of beams secured between structures engaging an interior wall of said enclosure and said tubes.

4. The conveyor system according to claim 3 wherein said carriage rides above said tubes and said support means includes short posts extending upwardly of said beams to support said tubes and a plurality of substantially vertical rods secured to said beam adjacent to said carriage, said rods secured to the enclosure ceiling above said conveyor system.

5. The conveyor system according to claim 3 wherein said carriage rides below said tubes and said support means includes short posts extending upwardly of said beams to support said tubes, said beams extending between opposite vertical walls of the enclosure and being supported thereby.

6. The conveyor system according to claim 1 wherein said two secondary stations and two conveyors are provided and said drive means includes:
   a reversible drive motor:
   a drive pulley engaging the cables serving first and second secondary stations;
   pulley and belt means driven by said motor and adapted to drive said drive pulley; and
   means for maintaining tension in said cables and belt.

7. The conveyor system according to claim 1 wherein said main station is located in a bank building, said secondary stations are automatic teller machines, said carriage is adapted to carry a cash box and said conveyor runs through a break-in resistant enclosure between said bank and automatic teller machines.

8. A high security, high reliability, conveyor system which comprises:
   a main station;
   two secondary station;
   at least two substantially parallel, smooth, continuous tubes extending between said main and each secondary station;
   support means for supporting said tubes along selected paths between said stations;
   a carriage adapted to move along each set of parallel tubes, each carriage comprising:
   at least one wheel assembly including a plurality of wheels adapted to ride along each of said tubes without interference from said support means, a plurality of assemblies, said assemblies each comprises a pair of inner brackets each of which support a pair of wheels which ride on one of said tubes, a plurality of pins secured to said inner bracket, a pair of outer brackets having spaced apart apertures equal in number to said plurality of pins adjacent to and spaced from said inner brackets, said pins slideably extend through said apertures in said outer brackets and compression springs surrounding each pin in the space between said inner and outer brackets, said assemblies provide a degree of resiliency to carriage movement so that said wheels can deflect slightly in turns, accommodate slight irregularities in the surface and spacing between said tubes;

a container mounted on said wheel assembly for movement therewith;

cable means between said stations along said support means;

a plurality of pulleys on said support means adapted to guide said cable substantially parallel to said tubes;

at least one bracket securing said carriage to said cable for movement therewith along said tube;

said bracket securing said carriage to said cable for movement therewith along said tube;

said bracket secured to said cable in a manner moving said cable away from each pulley as the bracket passes the pulley;

drive means at said main station for selectively moving said carriages toward or away from the secondary stations, said drive means comprising:

a reversible drive motor;

a drive pulley engaging the cables;

drive means connecting said drive pulley to said motor to rotate said drive pulley;

whereby said containers are movable between said main station and said secondary stations.

9. The conveyor system according to claim 8 wherein each of said carriages further includes means for spring loading said wheels against each of said tubes.

10. The conveyor system according to claim 8 wherein four wheels are substantially equally spaced around each of said tubes.

11. The conveyor system according to claim 8 wherein an enclosure surrounds said conveyor between stations, and said support means comprises a first plurality of posts secured between adjacent structure engaging an interior wall of said enclosure and said tubes.

12. The conveyor system according to claim 11 said container rides above said tubes, and said adjacent structure includes a horizontal beam below said tubes to which said first posts are secured and a plurality of substantially vertical rods secured to said member adjacent to said carriage, said rods secured to the enclosure ceiling above said conveyor system.

13. The conveyor system according to claim 8 wherein said main station is located in a bank building, said secondary stations are automatic teller machines, each carriage is adapted to carry a cash box and said conveyor runs through a break-in resistant enclosure between said bank and automatic teller machines.

* * * * *